April 20, 1965 T. GROB ETAL 3,178,857

DRILL GRINDING METHOD AND APPARATUS

Filed Sept. 21, 1962 8 Sheets-Sheet 1

INVENTORS
Theodore Grob
Donald H. Tesker
BY
Attorney

April 20, 1965 T. GROB ETAL 3,178,857
DRILL GRINDING METHOD AND APPARATUS
Filed Sept. 21, 1962 8 Sheets-Sheet 3

INVENTORS
Theodore Grob
BY Donald H. Tesker

Attorney

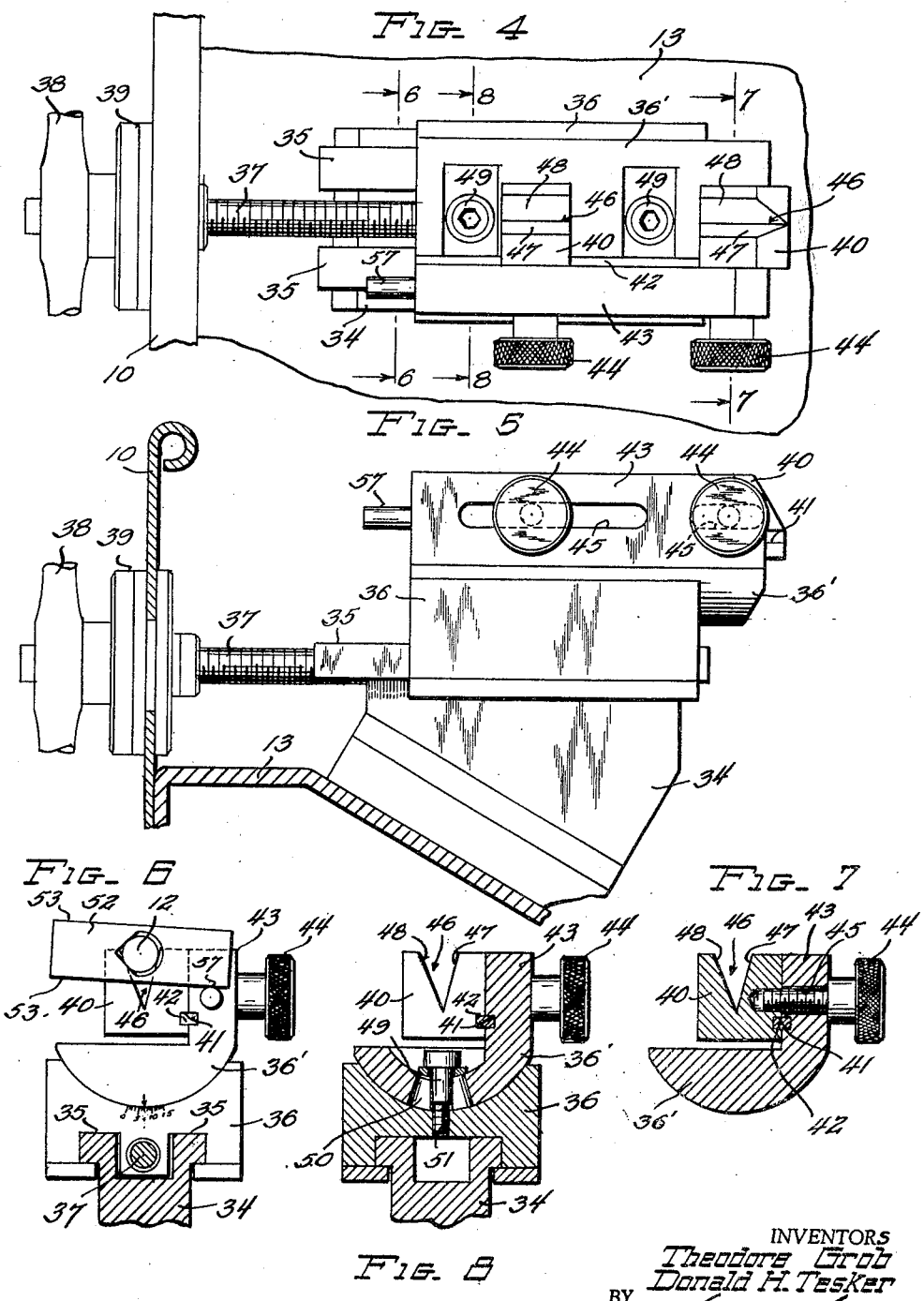

April 20, 1965 T. GROB ETAL 3,178,857
DRILL GRINDING METHOD AND APPARATUS
Filed Sept. 21, 1962 8 Sheets-Sheet 5
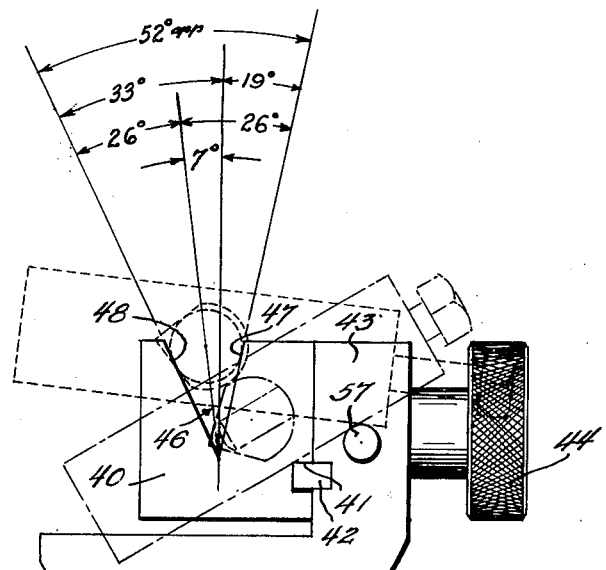
Fig. 9
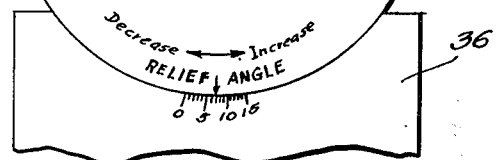
Fig. 10
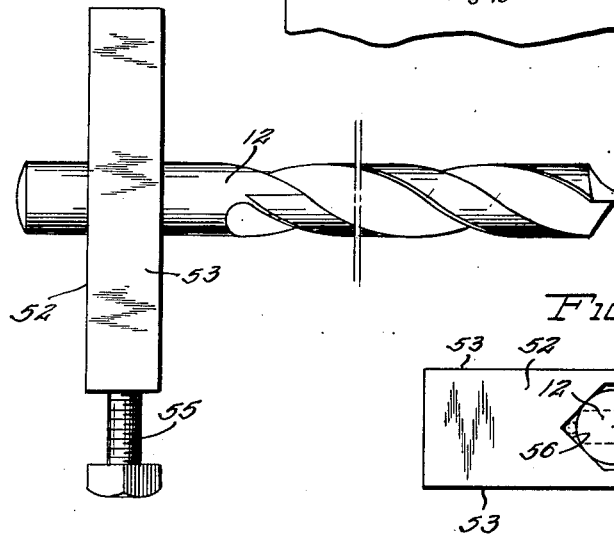
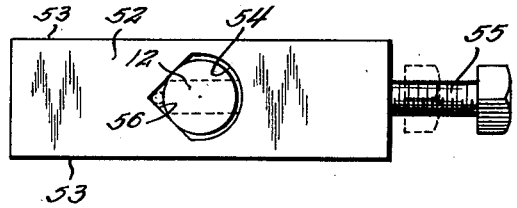
Fig. 11
INVENTORS
Theodore Grob
Donald H. Tesker
BY
Attorney April 20, 1965 T. GROB ETAL 3,178,857
DRILL GRINDING METHOD AND APPARATUS
Filed Sept. 21, 1962 8 Sheets-Sheet 6

INVENTORS
Theodore Grob
BY Donald H. Tesker

Lazo & Barry
Attorneys

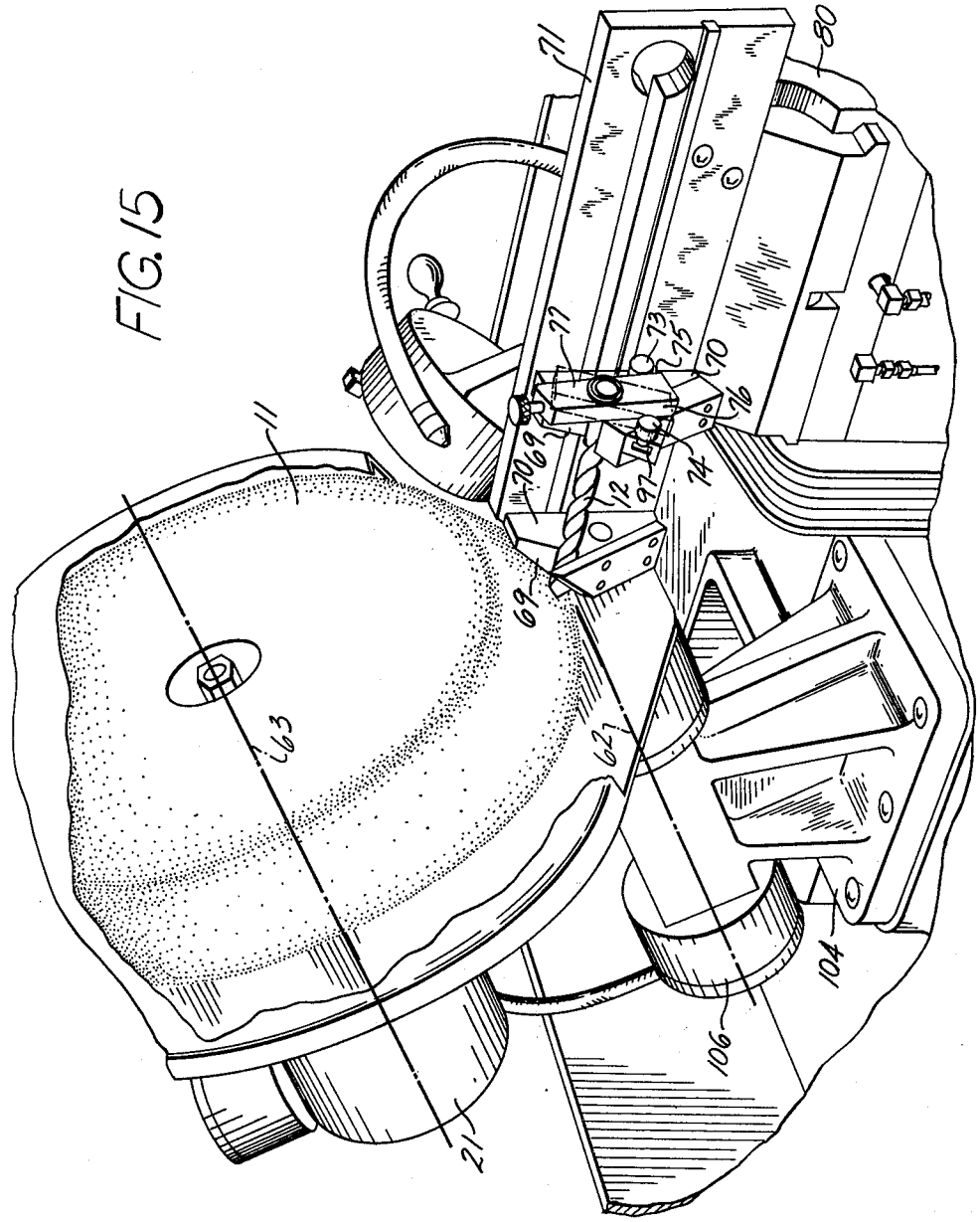

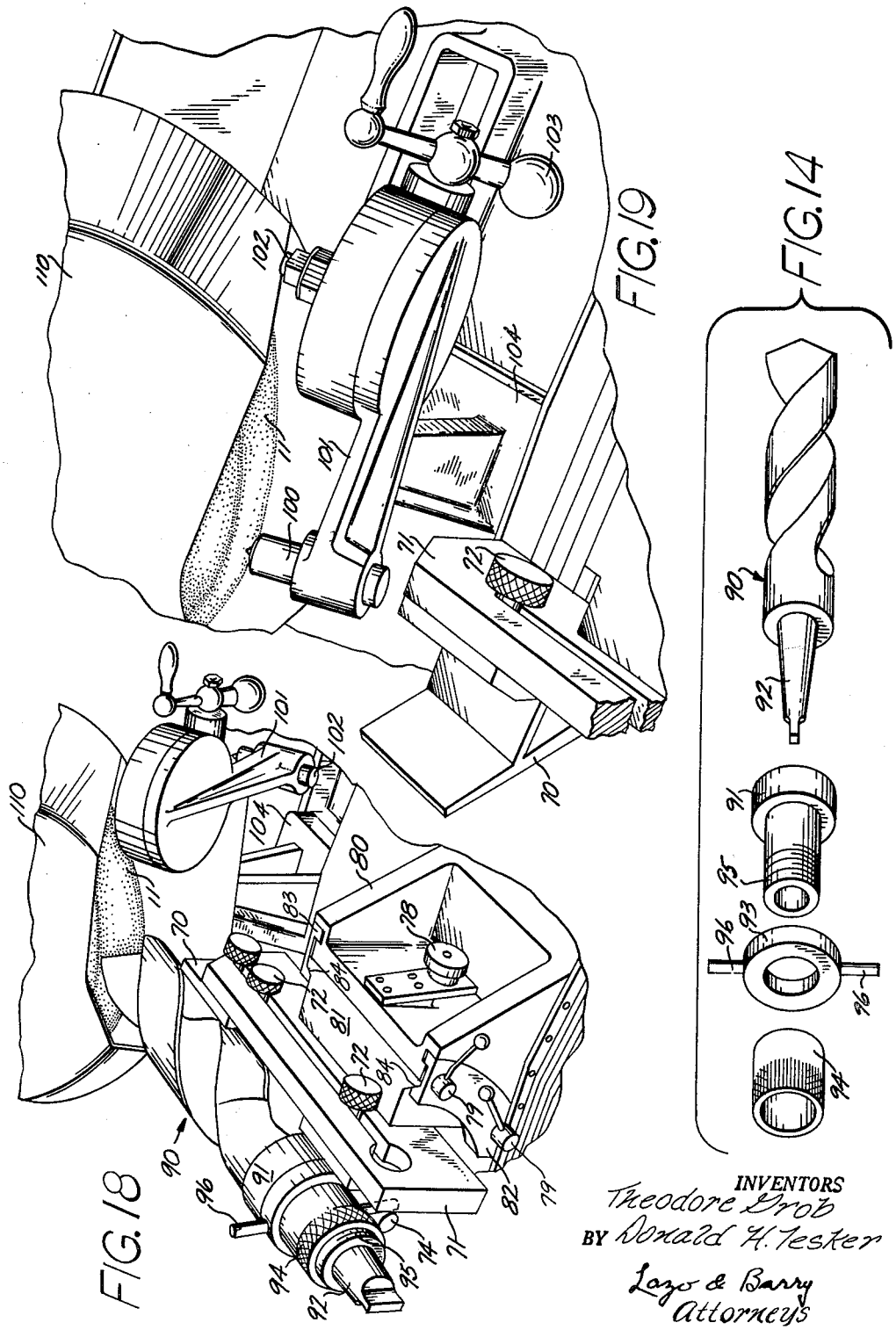

United States Patent Office 3,178,857
Patented Apr. 20, 1965

3,178,857
DRILL GRINDING METHOD AND APPARATUS
Theodore Grob, Grafton, and Donald Henry Tesker, West Bend, Wis., assignors to Grob & Tesker Corporation, Grafton, Wis., a corporation of Wisconsin
Filed Sept. 21, 1962, Ser. No. 226,771
20 Claims. (Cl. 51—33)

This invention relates to drill grinders and to a method for grinding drills and apparatus therefor. More particularly it relates to a novel drill grinding machine and method having utility for chisel point or center point grinding of variously diametered twist drills. This application is a continuation-in-part of patent application Serial No. 51,128, filed August 22, 1960, now abandoned, by the present inventors.

While numerous forms of drill grinders are now in common use, the vast majority if not all of the previous grinders require numerous set-up adjustments to effect the desired sharpening of variously diametered drills. Many of the drill grinders now in common use require four or more separate set-up adjustments in order to obtain satisfactory chisel point sharpening results. Adaption of these machines for center point sharpening would increase the complexities of the grinding operation multifold and for all practical purposes make precision grinding of center point drills impractical for commercial operations.

Heretofore, the requirement in drill grinders of numerous set-up adjustments has given rise to faulty drill grinding due partially to the possibility of human error in making the set-up adjustments. Furthermore, the need for the various adjustments each time a different diameter drill is to be sharpened has materially increased the time required for effecting the proper grinding of a large number of drills.

The present invention provides a substantial reduction in the number of set-up adjustments required between the cooperating elements of a grinding machine in order to obtain highly satisfactory results, not only in chisel point grinding but as well in center point grinding of variously diametered drills.

The basic concept of the present invention stemmed from the idea of utilizing a hollow conical grinding wheel. However, the relatively small size of such a wheel coupled with the problem of excessive wear on the wheel with the resultant need for frequent wheel dressings led to the discovery of the presently disclosed invention.

The present invention affords a new and improved drill grinder and a novel method of grinding drills wherein the only manually controlled operation in sharpening variously diametered twist drills comprises the mounting of the drill in a drill support and the feeding of the drill into contact with the grinding surface of the grinding wheel. The elimination of the numerous, previously required set-up adjustments of the cooperating elements of the machine has resulted from the discovery that the initial establishment of the proper angular relationship between the drill positioning and supporting element and an oscillating grinding wheel will serve to provide the correct point, relief and chisel angles, for the proper sharpening of drills. In addition to the fact that the present machine affords the above described characteristics without requiring numerous set-up adjustments, it is provided with means whereby a range of variously diametered drills may be successively correctly sharpened by reason of the new and novel drill positioning and supporting element that automatically effects the desired and correct relationship between the point of variously diametered drills and the grinding surface of the wheel.

Broadly, the present invention provides a method for grinding a drill comprising the steps of rotating a grinding wheel having a peripheral portion having a truncated conical configuration, oscillating the grinding wheel on an axis substantially parallel to the axis of said grinding wheel to generate a portion of a hollow cone, and feeding a drill to be ground into the peripheral surface of said wheel to grind a portion of a conical surface on the end of the drill. In accordance with this invention the drill grinding machine comprises a base, a grinding wheel support member which is rockably mounted on said base, a grinding wheel mounted on said support member with its axis of rotation disposed substantially parallel to the axis on which said support member is rockably mounted, said grinding wheel including a peripheral portion of truncated conical configuration with the peripheral surface dressed for grinding, and driving means operative to effect the unitary oscillating movement of said support member and said grinding wheel mounted thereon, whereby the peripheral surface of the wheel describes a portion of a conical grinding surface during its oscillating movement.

The drill support that comprises an important element of the present invention is designed in a manner that renders it capable of selectively receiving and correctly positioning variously diametered drills in a manner such that the line through the axis of any selected drill moves radially outwardly, as the diameter of the drill increases, from the apex of an imaginary hollow cone, a portion of which cone is generated by the oscillating movement of the peripheral conical surface of a grinding wheel.

The primary object of the present invention is to provide a drill grinder which generates a grinding surface in the form of a portion of the surface of a hollow cone, which surface can be used to provide chisel point or center point sharpening of drills.

Another object of the present invention resides in the provision of a new and improved drill grinder so constructed as to require a minimum number of set-up adjustments between its cooperating parts in order to effect the proper chisel point and center point sharpening of various diametered twist drills. The manual adjustments required in the machine of the present invention are the initial mounting of the drill in the drill support and the feeding of the positioned drill into contact with the grinding surface of an oscillating grinding wheel.

Another object of the invention resides in the provision of a drill grinder wherein an oscillating grinding wheel and a drill support capable of selectively receiving and properly positioning any of a range of variously diametered drills are so disposed with respect to each other that the drills may be accurately and correctly ground without requiring any adjustments of the cooperating elements of the machine other than that of a feeding movement to the positioned drill to be sharpened.

Another object of the invention resides in the provision of a new and improved drill positioning and supporting member capable of selectively and properly positioning different sized drills so that they may be selectively and properly ground.

Another object resides in the provision of a drill supporting member that will properly position a range of differently diametered drills with respect to the grinding surface of a wheel without requiring adjustment between the established relationship of the grinding wheel with respect to the drill supporting member.

Another object resides in the provision in the drill supporting member of a V-groove adapted to receive and position variously diametered drills in a manner such that the distance between the axis of the variously diametered drills and the apex of an imaginary hollow cone generated by the grinding wheel increases as the diameter of the drill increases to automatically compensate for the increasing thickness of the webs of the drills as their diameters increase.

Another object resides in the provision of a dog or clamp for application to the drill for the dual purpose of initially establishing the correct relationship between one cutting edge of the drill and the grinding surface of the wheel prior to the grinding of one land of the drill and for insuring the correct positioning of the other cutting edge of the drill with the grinding wheel when the dog and the associated drill are rotated for the purpose of grinding the other lands of the drill, for example, the second, third or fourth land, in the case of 2, 3 or 4 fluted drills, to complete the sharpening of the drill.

Another object resides in the provision of means on the drill positioning and supporting element with which the dog cooperates to properly establish and maintain the desired positioned relationship between the grinding surface of the wheel and the drill to be ground to effect either chisel point or center point grinding of the drill.

Another object of the present invention is to provide a means for accurately and simply dressing a grinding wheel so that the grinding wheel is in the grinding position when the dressing operation is completed.

Other objects and advantages will become apparent from the following description of illustrative embodiments of the present invention taken in connection with the accompanying drawings, in which:

FIG. 4 is an enlarged top plan view of the drill positioning and supporting element together with its manually operable feeding means;

FIG. 5 is a side elevational view of the structure shown in FIG. 4;

FIG. 6 is a transverse vertical sectional view, taken on the line 6—6 of FIG. 4, showing the drill supporting and positioning element in rear elevation with a drill in position on the drill supporting element;

FIG. 7 is a transverse vertical sectional view, taken on the line 7—7 of FIG. 4, showing clamping means for releasably retaining one of the drill positioning members in properly adjusted position on the drill supporting element;

Figure 13:
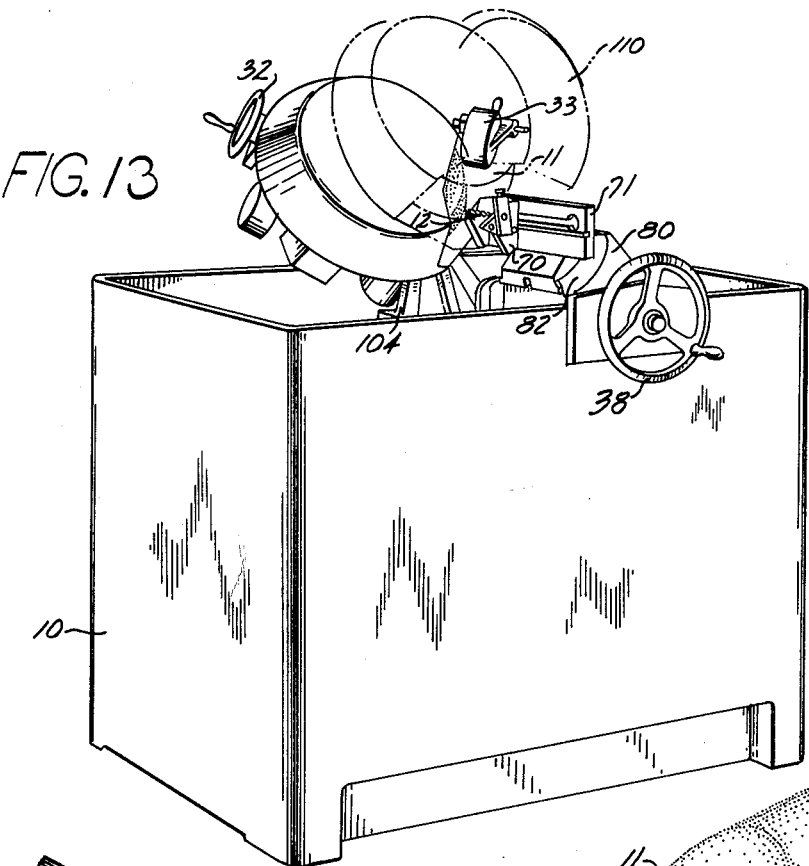
Figure 16:
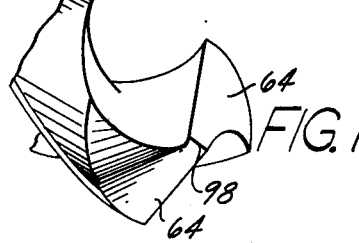
Figure 12:
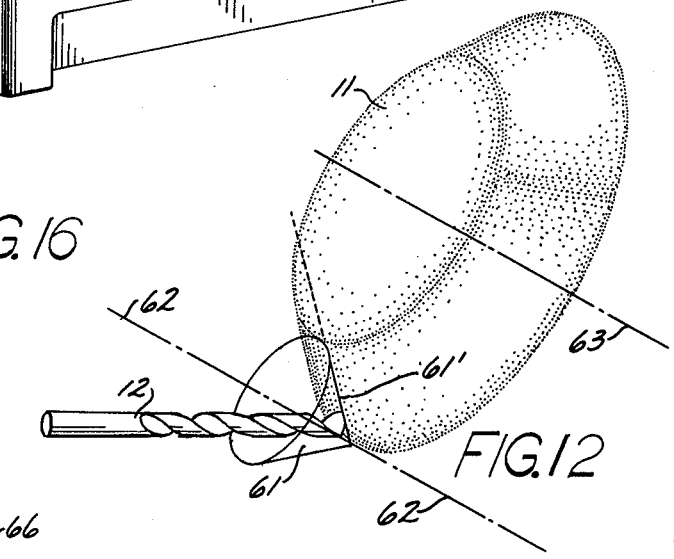
Figure 17:
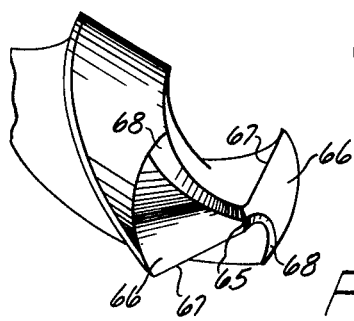

FIG. 8 is a transverse vertical sectional view, taken on the line 8—8 of FIG. 4, showing means for releasably retaining the drill positioning and supporting element in desired angular position to adjust the angularity of the V-groove with respect to the common plane passing through the apex of the V-groove and the axis about which the grinding wheel is oscillating to vary the sharpening angle of all of the random sized positioned drills as the need requires;

FIG. 9 is an enlarged rear elevational view of the drill supporting element showing, in dotted lines, a drill clamping dog positioning a relatively large diametered drill in the V-groove on the drill positioning member and a dot-dash showing of a drill clamping dog positioning a relatively small drill in the drill positioning member;

FIG. 10 is a top plan view of a drill clamping dog properly applied to releasably retain a drill with the cutting edge to be ground disposed in a vertical plane;

FIG. 11 is a rear elevational view of FIG. 10 including a dotted line showing of the positioning of a relatively small diametered drill in the dog;

FIG. 12 is a view of the imaginary cone a portion of which is generated by the grinding wheel as it is oscillated on the base;

FIG. 13 is a view of another embodiment of the drill grinder showing the grinding wheel in three different positions;

FIG. 14 is an exploded view of a modification of the dog used to hold the drill;

FIG. 15 is a view of a drill in the drill support;

FIG. 16 is an end view of a chisel point drill;

FIG. 17 is an end view of a center point drill;

FIG. 18 is a view of a drill positioned in a modified drill support; and

FIG. 19 is a view of a modified grinding wheel dresser.

Figure 1:
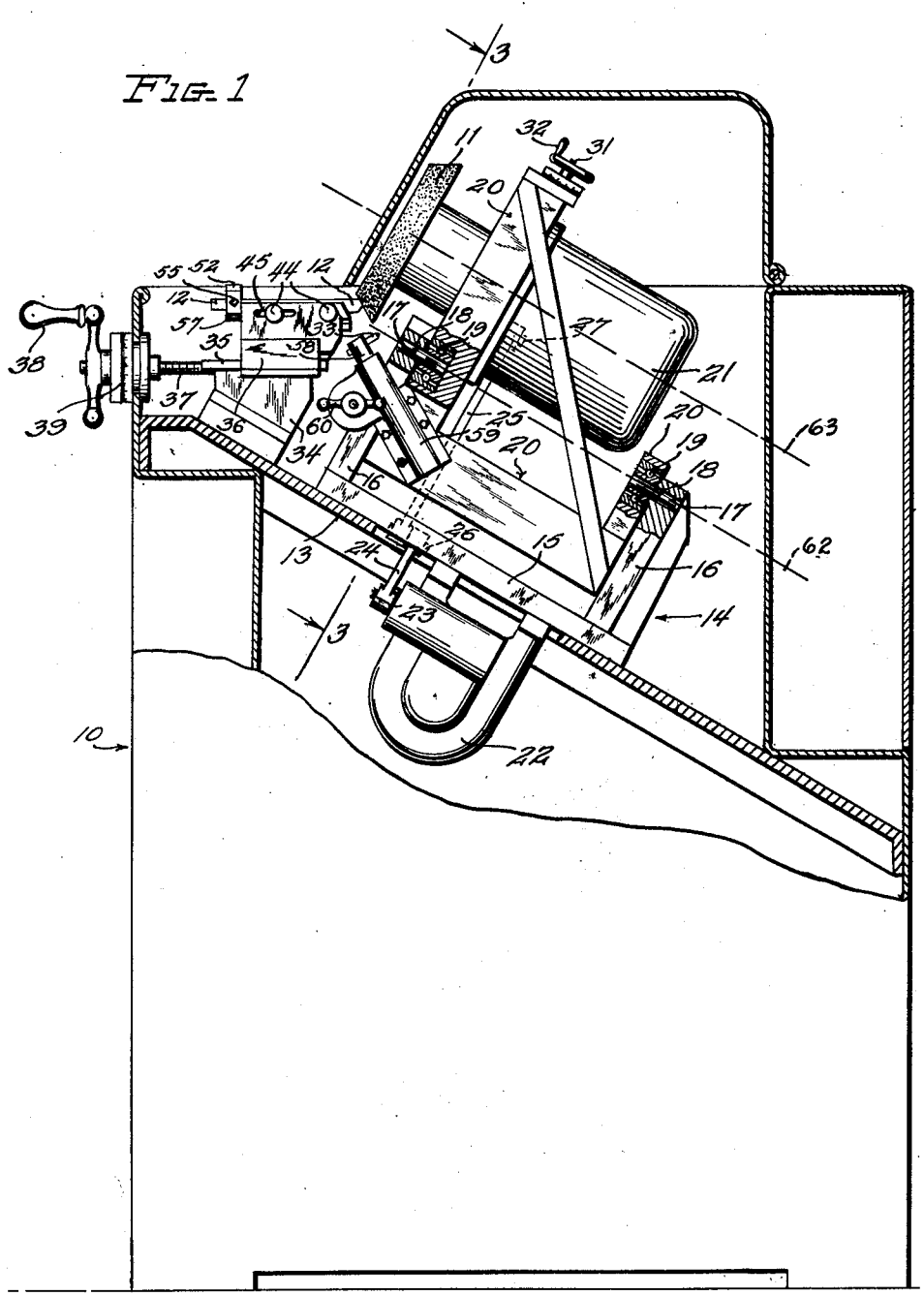
FIG. 1 is a side elevational view of one embodiment of a drill grinder, constructed in accordance with the present invention, with parts of the casing broken away to illustrate the relative angular position, in one plane, between the oscillating grinding wheel and the axis of the drill to be ground.

Referring more particularly to FIG. 1 of the accompanying drawings, which is a side elevational view of the machine with parts broken away to better show the relative angular positioning, in one plane, between the axis on which the grinding wheel oscillates and the axis of a positioned drill, it will be noted that the machine comprises a hollow base 10 adapted to house the desired control panel and coolant pumps (not shown).

The hollow base 10, which forms no part of the invention, may be made in any approved manner such as a casting or a steel weldment.

Figure 2:
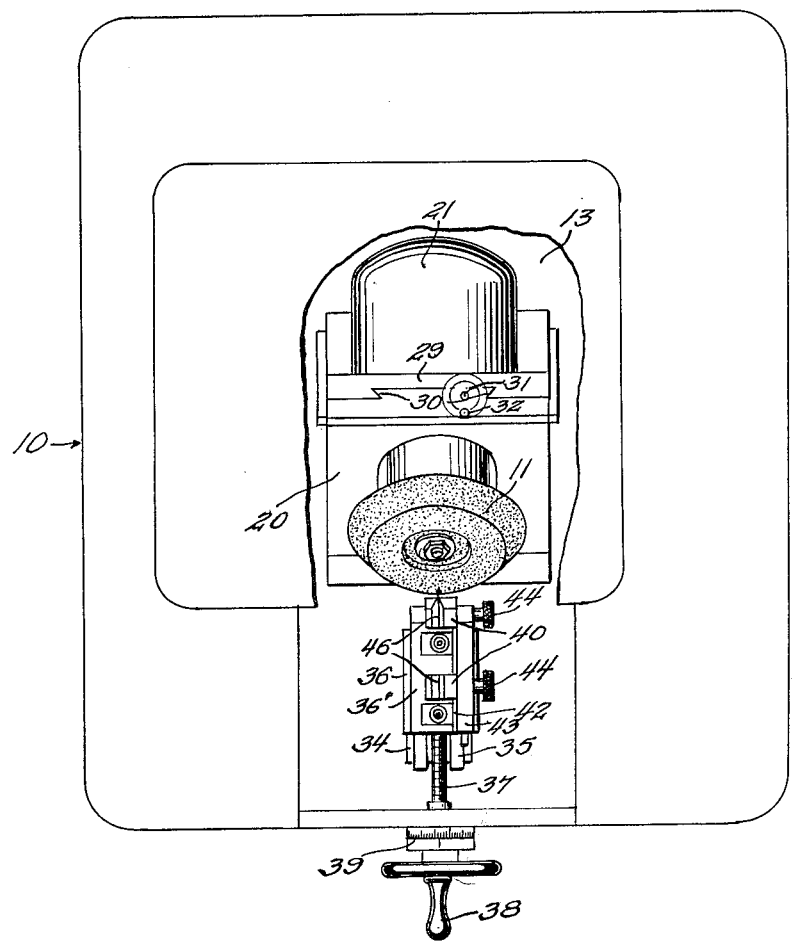
FIG. 2 is a top plan view of the machine, shown in FIG. 1, with parts of the casing broken away to show the normal alignment of the oscillating grinding wheel axis with the axis of the tilted V-groove that forms the positioning means for the random diametered drills to be ground.
Figure 3:
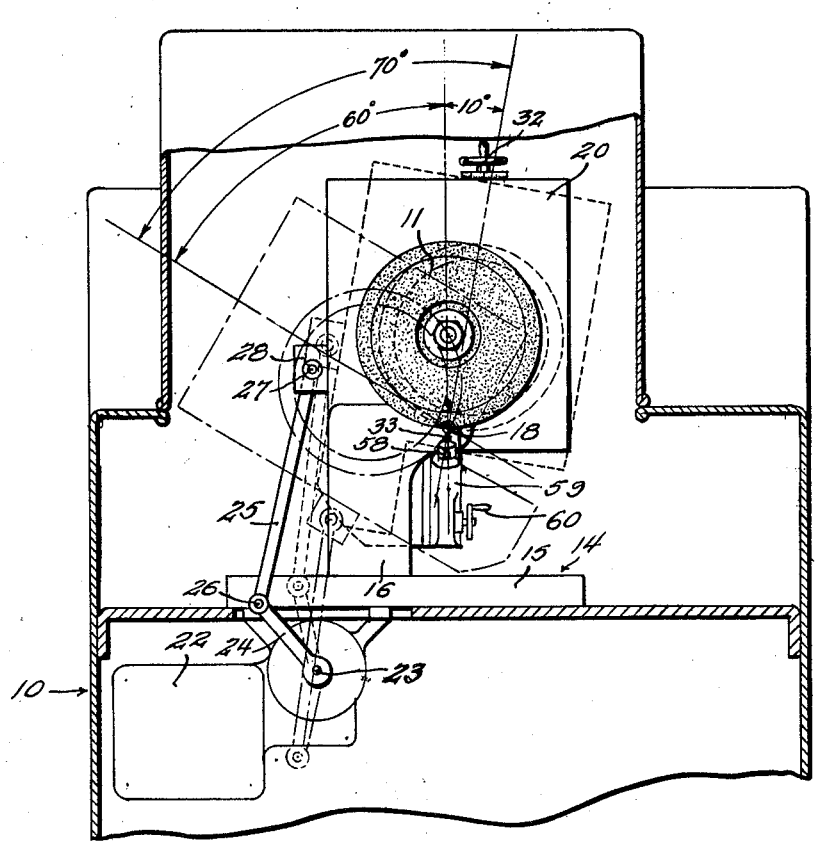
FIG. 3 is a sectional view, taken substantially along the line 3—3 of FIG. 1, showing the degree of oscillation of the grinding wheel together with means for effecting its oscillating movement.

For the purpose of affording a compact and highly desirable cooperating relationship between a grinding wheel 11 and a drill 12 to be sharpened thereon, the hollow base 10 is provided with an angularly disposed plate 13 that extends rearwardly and downwardly from the front of the machine. In the embodiment shown in FIGS. 1–3, the plate 13 is disposed at an angle of substantially 30° with respect to a horizontal plane passing through the base 10 of the machine.

A bifurcated frame member 14 comprising a base 15 and a pair of spaced upright members 16 is fixedly attached to the plate 13 in any approved manner.

A pair of axially aligned bores 17 formed in the spaced upright members 16 serve to respectively receive stub shafts 18, the inner ends of which are supported in anti-friction bearings 19 to provide a rockable support for a frame member 20 on which a motor 21 is radially adjustably mounted with respect to aligned shafts 18. The grinding wheel 11 is removably attached to the armature shaft of the motor 21 in any approved manner. It should be noted that the axis of the stub shafts 18 and that of the armature shaft of the motor 21 are disposed in substantially parallel relationship so that rocking movement of the frame member 20 on stub shafts 18 serves to effect the oscillating movement without imparting a gyroscopic effect on the grinding wheel 11 as it transverses an arcuate path with respect to the axis of the stub shafts 18.

The means for effecting the oscillating movement of the frame member 20 and its associated motor 21 comprises a motor 22 that is fixedly secured to the lower surface of the base 15 of the frame member 14. In the present instance, the motor 22 is of the gear reduction type including a worm and a worm wheel respectively mounted on the armature shaft of the motor 22 and a driven shaft 23 that is suitably journalled in the motor casing. An exposed end of the driven shaft 23 provides a mounting means on which a crank arm 24 is fixedly attached. A connecting rod 25 has one of its ends rockably mounted on a pin 26 carried by the free end of the crank arm 24. The other end of the connecting rod 25 is rockably mounted on a pin 27 carried by a boss 28 formed on the frame member 20.

When the grinding machine is in use, both motors 21 and 22 are in operation to respectively cause the rotation of the grinding wheel at the desired speed and to effect the oscillating movement of the grinding wheel under the control of the motor 22 and its associated motion transmitting means.

Preferably, the arrangement of the motion transmitting means between the motor 22 and the frame 20 is such that the oscillating movement of the grinding wheel 11 traverses an angle of approximately 70°.

In the illustrated form of the present invention as is more clearly shown in FIG. 12, it will be noted that the portion of the grinding wheel 11 utilized in effecting the sharpening of the drill comprises the peripheral surface of a truncated conical grinding wheel wherein the angle of the line contact between the grinding surface of the wheel 11 and the axis of the drill to be ground is approximately one of 60° so that the included point angle of the sharpened drill is approximately 120°. As the grinding wheel is oscillated on the axis 62 of the support member, the grinding surface generates a segment of a hollow cone 61 shown pictorially in FIG. 12. The oscillating grinding wheel is the generating medium and the point of engagement on the flank of a drill point is a straight line 61' in the same plane as the axis of rotation 63 of the grinding wheel. In all instances, the apex of the imaginary hollow cone lies on the line which is the axis of oscillation 62 of the grinding wheel. In the case of smaller drills the apex of the cone 61 is within the periphery of the grinding wheel so that a relatively small cone is generated by the motion of the grinding wheel.

The drill supporting mechanism comprises a base member 34 fixedly attached to the plate 13. The upper surface of the member 34 is provided with suitable ways 35 disposed in a horizontal plane and adapted to slidably receive a plate 36 provided with guide means that cooperate with the ways 35. A feed screw 37 rotatably mounted in the hollow base 10 has its body portion threadedly engaged with the plate 36. A hand wheel 38 provided with a micrometer dial 39 is operatively associated with the feed screw 37 to effect the desired advance or retraction of the plate 36 toward or from the grinding wheel 11 upon rotation of the hand wheel 38.

A pair of drill positioning members 40 are each provided with a keyway 41 for sliding movement along a key 42 mounted in an upstanding flange 43 formed on plate 36'. The members 40 are retained in desirable spaced relationship on the key 42 by means of hand screws 44 that are laterally movable in slots 45 formed in the flange 43. The tightening of the hand screws 44 serves to releasably retain the drill positioning members 40 in desired spaced relationship along the key 42.

A longitudinally extending laterally tilted V-groove 46 interrupts the upper surface of each of the members 40. The respective grooves 46 have their apexes in a common line disposed in a plane common to the axis about which the grinding wheel oscillates.

The lateral tilted positioning of the V-grooves 46 in the relatively movable supporting members 40 is of particular significance to the successful operation of the present machine for the reason that it affords a means whereby variously diametered drills will be correctly positioned with respect to the grinding surface of wheel 11 to properly sharpen the point of the drill when it is moved into contact with the grinding surface of wheel 11. It should be noted that no relative adjustment is required between the supported drill and the grinding wheel in order to obtain the identical sharpening angle on any positioned drill.

Referring more particularly to FIG. 9, it will be noted that one face 47 of the V-groove 46 is disposed at an angle of approximately 19° with respect to the vertical plane that passes through the apex of the groove 46 and the axis 62 about which the grinding wheel 11 is oscillated. The other face 48 of the groove 46 is disposed at an angle of substantially 33° from the vertical plane previously mentioned so that the included angle between the cooperating faces 47 and 48 of the groove 46 is substantially 52°. With the diverging faces 47 and 48 of the V-groove 46 disposed at opposite sides of the common plane of the apex of the V-groove and that of the oscillating grinding wheel 11, it will be noted that the center line or axes of the variously diametered drills will automatically fall in a common plane that bisects the included angle of the V-groove 46. The laterally tilted V-groove 46 serves to automatically provide the proper offset of the cutting edge of the positioned drill to compensate for the difference in web thickness of the variously diametered drills and to provide the identical sharpening angle for the different sized drills, by positioning the axes of larger diametered drills a greater distance from the common plane of the apex of the V-groove 46 and the axis about which the grinding wheel 11 oscillates.

While the above described arrangement has been found to be an entirely satisfactory means for selectively and uniformly sharpening different sized drills, there are some instances where the diameter of the drill and the material to be drilled dictate the desirability of other sharper or less sharp relief angles on the sharpened drills. In the event that a different relief angle is desired, a simple adjustment may be made to accomplish the desired need. Referring more particularly to FIGS. 8 and 9, of the accompanying drawings, it will be noted that the bottom of the plate 36' and the upper surface of the plate 36 are formed on a common radius struck from the apex of the V-groove 46. The plate 36' is releasably retained in properly adjusted position on the member 36 by means of an Allen head screw 49 that passes through a slot 50 formed in the plate 36' and threadedly received in a bore 51 formed in the member 36. To adjust the laterally tilted angle of the V-groove 46, the screws 49 are loosened and the plate 36' rotated in a clockwise direction to decrease the relief angle of the sharpened drills or in a counterclockwise direction to increase the relief angle of the sharpened drill using the cooperating indicia formed on the ends of the members to establish the desired relief angle for the identical sharpening of different sized drills.

Since the present invention is directed primarily to the new and improved means by which twist drills of different diameters are identically sharpened, it is essential that the proper relationship be initially established between one of the cutting edges of the drill and the line of contact between it and the grinding wheel. In order to establish the desired and proper relationship between it and the surface of the grinding wheel, the drill to be sharpened is placed in the V-groove 46 with the faces 47 and 48 of the groove establishing line contacts with circumferentially spaced portions of the drill. The drill is then manually rotated to a position wherein one of its cutting edges lies approximately vertically in the plane forming an angle of approximately 19° with face 47 of V-groove 46. With the drill manually retained in this position, a dog 52 is applied to the portion of the shank of the drill that lies beyond the end face of the upstanding flange 43 formed on the plate 36.

As best illustrated in FIGS. 10 and 11 the dog 52 is provided with parallel surfaces 53, a transversely extending centrally disposed drill receiving opening 54 and a clamping screw 55. The contour of the drill receiving opening 54 includes a V-shaped portion 56 adapted to establish circumferentially spaced line contacts with the shank of the drill and the tightening of the clamping screw 55 serves to releasably retain the drill in clamped position within the dog.

To maintain the desired fixed relationship between the drill and the dog when one cutting edge of the drill is properly positioned with respect to the surface of the grinding wheel 11, the dog 52 is loosely applied over the exposed end of the shank of the drill. A suitable abutment surface 57, presently illustrated in the form of a pin, projects outwardly from the end of the flange 43. The surface of the pin 57 provides an abutment against which one of the parallel surfaces 53 of the dog may be positioned when one cutting edge of the drill is properly positioned with respect to the surface of the grinding wheel. With the several pieces retained in desired relative position, the clamping screw 55 may be tightened to establish and maintain the drill in clamped position in the dog 52. In establishing the correct initial position of the drill with respect to the surface of the grinding wheel, care should be taken that the point of the drill to be sharpened projects beyond the inner drill supporting member 40 and that the front face of the dog 52 is in surface contact with the end of the flange 43 of the plate 36' where it is manually retained during the subsequent drill sharpening operation. With the machine in operation, and the positioned drill manually held with the forward surface of the dog 52 in contact with the end of the flange 43 and one surface 53 of the dog in abutting contact with the pin 57, the hand wheel 38 is rotated to advance the point of the drill into contact with the grinding surface of the wheel 11 and continue its advance until the entire surface of one land has been completely sharpened. The reading of the micrometer dial 39 should be noted prior to the retraction of the ground drill and the plate 36 by the rotation of the wheel 38 in the opposite direction. In the grinding of two-flute drills, after the drill has been retracted, the clamped drill and dog 52 are rotated through an angle of 180° so that the other surface of the dog 52 is in contact with the surface of the abutment pin 57 to properly position the other cutting edge of the drill with respect to the grinding wheel 11. The hand wheel is again rotated in a direction to feed the indexed positioned drill against the cutting surface of the wheel during its oscillating movement and the drill is advanced to a point where the micrometer reading is identical with that indicated at the completion of the sharpening of the other land of the drill. The foregoing procedure insures the accurate, correct and identical sharpening of both lands of the positioned drill regardless of its diameter. Drills sharpened as above will have a chisel point as shown at 98 in FIG. 16. Each land 64 of the drill has been ground in a single step having one smooth surface on each land.

With the modified drill grinder shown in FIG. 15, it is possible to grind a drill either with a chisel point or with a center point 65 such as shown in FIG. 17. Each land of the drill will have a first conical surface 66 which defines a cutting edge 67 and a second surface 68 which forms the center point. Referring again to FIG. 15, the grinding wheel 11 is mounted on a bracket 104 by means of a support member 106 that is mounted to rotate on an axis 62 parallel to the axis 63 of the grinding wheel. The grinding wheel is housed within an enclosure 110 with one section of the enclosure cut away to expose the grinding wheel. A drill 12 is positioned in V-grooves 69 in support members 70 which are retained in plate 71 by adjusting screws 72. The rear support member is provided with a fixed pin 73 and an adjustable pin 74 both of which form abutments for the parallel surfaces 75 and 76 of dog 77. The dog is mounted on the drill as described above with parallel surface 75 abutting pin 73. The drill is moved axially into the peripheral surface of the grinding wheel to grind the first surface 66 on one of the lands of the drill. The distance the drill is moved axially to complete this grinding step is then noted. The dog is then rotated clockwise until parallel surface 76 abuts pin 74. The drill is then fed into the peripheral surface of the grinding wheel the same distance as noted for the first step. This completes the grinding of the two surfaces on one of the lands of the drill which is then turned over and the two grinding steps repeated on the other land. The width of the second surface on the land of the drill can be widened by sliding pin 74 to different positions in slot 97 in the support member.

In the modified drill support structure shown in FIGS. 15 and 18, the sharpening angle of the drill can be adjusted by loosening set screws 79 in front plate 82 and turning adjusting screw 78 on the back of bracket 80. Support member 81 which supports plate 71 will slide on an angular surface on the bracket rotating the drill support in a circle having its center at the apex of the V-grooves. When the desired angle is reached the set screws are tightened to seat support member 81 between front plate 82 and back plate 83. The angled surfaces 84 on the support member and bracket will squeeze the support member against the bracket so that it cannot move with respect thereto.

A modified dog arrangement is shown in FIG. 14 which can be used for holding a tapered shank type drill 90. A tapered sleeve 91 is seated on the tapered shank 92 of the drill by friction. An index ring 93 is rotatably positioned on the sleeve and a knurled nut 94 is screwed onto the threaded portion 95 of the sleeve. The drill is positioned in the V-groove and rotated to properly align the cutting edge with respect to the peripheral surface of the grinding wheel. The index ring is rotated until one of the pins 96 abuts the aligning pin 73. The knurled nut is turned to seat the index ring on the sleeve thereby establishing the relation between the index ring and the cutting edges of the drill. The same grinding steps are then performed as above. Three- and four-flute drills can be ground by using an index ring having pins circumferentially spaced at angles of 120° and 90° respectively, in place of the index ring having two pins at an angle of 180°.

In order to compensate for variations in the diameter of the grinding wheel 11 due to normal wear and required redressing of the wheel, the motor 21 is carried by a supporting plate 29 that is mounted for adjustable sliding movement radially with respect to the axis of the stub shafts 18 in ways 30 formed in the frame member 20. A feed screw 31 is journalled for rotation in the member 20 and has its body portion threadedly engaged with the motor supporting plate 29. The exposed end of the feed screw 31 is provided with a hand wheel 32 operable to effect the feeding movement of the grinding surface of the wheel 11 into contact with a movable wheel dressing tool 33.

Referring to FIG. 1 of the accompanying drawings, it will be noted that the wheel dressing tool 33 extends radially from an axially movable shaft 58 that is housed in a casting 59 fixedly attached to one of the spaced upright members of the frame 20. In FIG. 1, the wheel dressing tool 33 is shown in its inactive or retracted position. A suitable crank 60 provides the means by which the axially movable shaft may be advanced to render the wheel dressing tool operative to redress the grinding surface of the wheel when the hand wheel 32 is rotated to effect radial movement of the grinding wheel toward the axis about which the wheel oscillates. The fixed angular relationship between the wheel dressing tool and the axis on which the wheel rotates coupled with the fact that the dressing tool and wheel retain their same relative position at all times serves as a means to insure the proper dressing of the wheel to maintain the required angle contact with the drill to insure the proper sharpening of the tool. It should be further noted that at the completion of the dressing operation, the grinding wheel will be properly positioned to grind the drills.

A modified wheel dressing arrangement (FIGS. 18 and 19) may be used to dress the surface of the wheel if desired. This arrangement has a diamond point dressing tool 100 mounted on the end of arm 101 which is mounted to rotate about pin 102. The point of the dressing tool is movable in a line on the surface of the imaginary grinding cone generated by the oscillatory motions of the grinding wheel. In this dressing operation, the grinding wheel is rotated on its own axis without oscillation. The dressing tool is moved back and forth across the peripheral face of the grinding wheel by turning hand wheel 103. If the tool does not engage the entire surface of the wheel, the wheel is moved toward the tool as described above until the entire peripheral surface of the grinding wheel is engaged by the tool. The tool is then rotated to an inoperative position and the wheel is in position to grind the drills.

From the foregoing description of the illustrative embodiments of the present invention, it will readily be seen that a new and improved drill grinder has been provided that is simple in form and effective in operation to insure the uniform and correct sharpening of different diametered twist drills without requiring any major set-up adjustments between the cooperating elements of the machine. One of the marked advantages of the present drill grinder resides in the relative positioning between an oscillating grinding wheel and a drill supporting and positioning member adapted to feed the positioned drill into contact with the grinding surface of the oscillating wheel.

Another marked advantage is found in the use of a laterally tilted V-groove formed in the drill supporting and positioning member whereby the axes of variously diametered drills fall into a common plane that effects the automatic lateral displacement of a positioned drill to insure the correct and uniform sharpening of any drill positioned therein. Another marked advantage of the present invention is found in the provision of a means whereby a positioned drill may be releasably retained in proper grinding relationship with the oscillating grinding wheel to insure the proper sharpening of variously diametered drills. Another advantage of the invention is found in the use of a simple and effective clamping dog adapted for releasable application to the drill in proper relationship with the grinding wheel to insure the uniform and correct sharpening of any random sized drills applied to the drill supporting and positioning member. A final advantage of the invention is moving of the grinding wheel toward the dress tool so that it is in the grinding position when the dressing operation is completed.

We claim:

1. A drill grinding machine comprising
   a base,
   a grinding wheel support member rockably mounted on said base,
   a power driven grinding wheel mounted on said support member with its axis of rotation disposed substantially parallel to the axis on which said support member is rockably mounted,
      said grinding wheel being of truncated conical configuration with its peripheral surface dressed for grinding,
   driving means operative to effect the unitary oscillating movement of said support member and said grinding wheel mounted thereon,
      whereby the peripheral surface of the wheel describes a portion of a conical grinding surface during its oscillating movement,
   a drill supporting member mounted for straight line movement on said base,
   feeding means operative to effect movement of said drill supporting member on said base, and
   a drill positioning V-groove formed on said drill supporting member, said V-groove having its apex disposed substantially in a common plane with the axis about which said grinding wheel support member oscillates,
   the diverging faces of said V-groove being disposed on opposite sides of said plane and at different angles with respect thereto,
   whereby the axes of variously diametered drills positioned in said V-groove lie in a common plane angularly disposed with respect to said first named plane, and
   the lateral displacement of the axis of each random sized positioned drill being such, with respect to said first named plane, that each of the random sized positioned drills will be ground at the identical sharpening angle when said drill supporting member is fed to a position wherein the point of the positioned drill contacts the surface of the oscillating power-driven grinding wheel.

2. A grinding machine, as set forth in claim 1, in which the included angle of said V-groove is approximately 52°.

3. A grinding machine, as set forth in claim 1, in which the plane that bisects said V-groove is disposed at an angle of approximately 7° with respect to the first named common plane.

4. A grinding machine, as set forth in claim 1, in which said drill supporting member is adjustably rotatable about the apex of said V-groove to vary the sharpening angle of the drills.

5. A drill grinding machine comprising
   a base,
   a grinding wheel support member rockably mounted on said base,
   a power driven grinding wheel mounted on said support member with its axis of rotation in substantially parallel spaced relationship with the axis on which said support member is rockable,
   motion transmitting means operative to effect unitary oscillating movement of said support member and said grinding wheel mounted thereon,
   a drill supporting member mounted for straight line movement on said base,
   feeding means operative to effect movement of said drill supporting member,
   a drill positioning V-groove in said drill supporting member, said V-groove having its apex disposed substantially in a common plane with the axis about which said grinding wheel oscillates and having its diverging faces disposed on opposite sides of said plane and at different angles with respect thereto,
   whereby the axes of random sized drills applied thereto lie in a common plane that is laterally tilted with respect to said first named plane passing through the apex of the V-groove and the axis about which said support member and said grinding wheel are unitarily oscillatably movable, and
   a grinding surface on said grinding wheel disposed at an angle with respect to the axis of a positioned drill,
   whereby each of the random sized positioned drills will be ground at the identical sharpening angle when said drill supporting member is fed to a position wherein the point of the positioned drill contacts the surface of the oscillating power driven grinding wheel.

6. A grinding machine as set forth in claim 5, in which said drill supporting member is adjustably rotatably positionable about the apex of said V-groove to establish a different sharpening angle for the random sized positioned drills.

7. A drill grinding machine comprising
   a base,
   a grinding wheel support rockably mounted on said base,
   a power driven grinding wheel mounted on said support and having its axis of rotation in substantially parallel relation with the axis of said support,
      said grinding wheel being of truncated conical configuration with its peripheral surface dressed for grinding,
   means for oscillating said support and said power-driven grinding wheel through a predetermined angle,
      whereby the peripheral surface of the wheel describes a portion of a conical grinding surface during its oscillating movement,
   a drill supporting member mounted for straight line movement on said base,
   feeding means operative to effect movement of said drill supporting member,
   a drill positioning V-groove in said drill supporting member, said V-groove having its apex disposed substantially in a common plane with the axis about which said grinding wheel oscillates and having its diverging faces disposed at opposite sides of said plane and at different angles with respect to said plane, an abutment surface on said drill supporting member, a drill positionable in said V-groove with one of its cutting edges disposed in a vertical plane, a dog removably mounted on the shank portion of said positioned drill, said dog having parallel surfaces and being rotatable to a position in which one of its parallel surfaces contacts said abutment surface, whereby one land of said positioned drill may be sharpened when said drill supporting member is fed to a position wherein the point of said drill contacts the surface of said oscillating power driven grinding wheel to effect the sharpening of one land of the drill, said dog and drill being rotatable through an angle of 180°, wherein the other parallel surface of said dog contacts said abutment surface to effect the identical sharpening of the other land of the positioned drill when said drill supporting member is advanced to the identical position assumed at the completion of the sharpening of the other land of said positioned drill.

8. A grinding machine, as set forth in claim 7, in which said drill supporting member is rotatably adjustably positionable about the axis of said V-groove to alter the sharpening angle for the random sized positioned drills to selectively render them more or less sharp.

9. A drill grinding machine comprising a base, a grinding wheel support rockably mounted on said base, a power driven grinding wheel mounted on said rockable support with its axis of rotation in substantially parallel spaced relationship with the axis about which said support is rockable, said grinding wheel being of truncated conical configuration with its peripheral surface dressed for grinding, motion transmitting means operable to effect oscillating movement of said support and said power driven grinding wheel, whereby the peripheral surface of the wheel describes a portion of a conical grinding surface during its oscillating movement, a drill supporting member having a V-groove, said member being mounted for straight line movement on said base, feeding means operative to effect movement of said drill supporting member, said V-groove having its apex disposed substantially in a common plane with the axis about which said grinding wheel oscillates but in angular relationship therewith and having its diverging faces disposed at opposite sides of said plane and at different angles with respect to said plane, whereby the axes of variously diametered drills positioned in said V-groove lie in a common plane angularly disposed with respect to said first named plane, the lateral displacement of the axis of each random sized drill being such with respect to said first named plane that each of the random sized positioned drill will be ground at the identical angle, an abutment surface on said drill supporting member, a drill positionable in said V-groove with one of its cutting edges disposed in a vertical plane parallel to said first named plane, a dog loosely applied on the shank portion of said properly aligned drill, said dog having parallel surfaces and being rotatable to a position in which one of its parallel surfaces contacts said abutment surface, and clamping means operable to releasably retain said properly positioned drill and dog in fixed relationship, whereby one land of said positioned drill may be sharpened when said drill supporting member is fed to a position wherein the point of said drill contacts the surface of said oscillating power driven grinding wheel, said dog and clamped drill being rotatable through an angle of 180°, wherein the other parallel surface of said dog contacts said abutment surface to effect the identical sharpening of the other land of the positioned drill when said drill supporting member is advanced to the identical position assumed at the completion of the sharpening of the other land of said positioned drill.

10. A grinding machine, as set forth in claim 9, in which said drill supporting member is rotatably adjustably positionable about the axis of said V-groove to alter the sharpening angle for the random sized positioned drills to selectively render them more or less sharp.

11. A drill grinder comprising a base, a grinding wheel mounted on said base, means for rotating said wheel on its own axis, said grinding wheel being of truncated conical configuration, means for oscillating said wheel about an axis substantially parallel to the axis of revolution of the wheel, the peripheral surface of said wheel generating a portion of the surface of a cone for grinding drills, grinding wheel dressing means mounted on said base and being movable from an inoperative position to an operative position on the surface of the cone generated by the wheel, and means for moving said wheel toward the axis of oscillation of said wheel to thereby dress the grinding surface of the wheel in the grinding position.

12. A drill grinder according to claim 11 wherein said dressing means includes an axially movable shaft mounted on said base, a dressing tool secured to said shaft, and means for moving said shaft on a line parallel to a line drawn through the apex of the cone generated by the peripheral surface of said wheel whereby said tool is moved on said line drawn through the apex of the cone.

13. A drill grinder according to claim 11 wherein said dressing means includes an arm mounted to pivot about one of its ends and a dressing tool secured to the other end of said arm in a position to move across the surface of the cone generated by the peripheral surface of the grinding wheel when the arm is rotated about the pivot.

14. A drill grinding machine comprising a base, a grinding wheel mounted on said base, means for rotating said wheel on its own axis, means for simultaneously oscillating said wheel about an axis parallel to the axis of revolution of the grinding, the peripheral surface of said wheel generating a portion of the surface of a cone having its apex on the axis of oscillation of the wheel, means for supporting a drill for axial motion toward the surface of the cone generated by the peripheral surface of the wheel with the axis of the drill in a substantially parallel relation to the lowermost side of the generated cone, and means for holding the drill in the support means with one of the lands of the drill aligned with the portion of the surface of the cone generated by the peripheral surface of the grinding wheel whereby the cutting edge on said land is sharpened by the grinding wheel.

15. A drill grinding machine according to claim 14 wherein said holding means comprises a transverse member mounted on said drill and having two parallel surfaces and a first abutment member secured to said support means in a position to engage one of the parallel surfaces on said transverse member to sharpen one land and the other parallel surface when the drill is rotated through 180° to sharpen the other land.

16. A drill grinding machine according to claim 15 wherein said holding means includes a second abutment member adjustably mounted on said support member in a position to engage the other parallel surface on said transverse member when the first land on said drill is sharpened and said one parallel surface on said transverse member when the second land on said drill is sharpened whereby a center point is formed on said drill.

17. A method for grinding a drill point comprising the steps of
rotating a grinding wheel having a truncated conical peripheral configuration,
oscillating said grinding wheel on an axis substantially parallel to the axis of said grinding wheel to generate a segment of a hollow cone having its apex on the axis of oscillation of the wheel,
aligning the axis of a twist drill in a substantially parallel relation to the lowermost side of said hollow cone, and
feeding the drill into the surface of the cone generated by said wheel to grind a portion of a conical surface on one of the lands of the point of the drill.

18. A method for grinding the lands of a twist drill comprising the steps of
rotating a grinding wheel on its own axis, said wheel having a truncated conical peripheral surface,
oscillating said grinding wheel on an axis substantially parallel to the axis of revolution of said grinding wheel to generate a segment of a hollow cone about the axis of oscillation of said wheel, said cone having its apex on the axis of oscillation,
positioning said drill at an angle to the axis of oscillation with the axis of the drill offset from the axis of oscillation and with the point of the drill at a distance from the apex of the generated cone at least equal to the radius of the drill and in a position to engage the portion of the cone generated by the peripheral surface of said wheel, and
feeding said drill axially into the portion of the cone generated by the peripheral surface of the grinding wheel to sharpen one of the lands of the drill.

19. A machine for grinding twist drills having at least two lands comprising a base,
a grinding wheel mounted on said base,
means for rotating said wheel on its own axis,
said grinding wheel having a truncated conical periphery,
means for oscillating said wheel about an axis substantially parallel to the axis of said grinding wheel to generate a portion of the surface of a cone,
support means for holding a drill with its axis at an angle to and offset from the axis of oscillation of said grinding wheel, said angle being approximately equal to one-half the included angle of the cone, and
drive means for moving the support means toward the portion of the surface of said generated cone, thereby grinding one of the lands of the drill.

20. A drill grinding machine according to claim 19 wherein the distance between the axis of rotation of the grinding wheel and the axis of oscillation of the grinding wheel is less than the largest radius of the grinding wheel.

References Cited by the Examiner
UNITED STATES PATENTS

| | | | |
|---|---|---|---|
| 684,890 | 10/01 | White | 51—219 |
| 1,546,453 | 7/25 | Oliver | 51—219 X |
| 1,759,196 | 5/30 | Jackson. | |
| 2,372,794 | 4/45 | Ricks | 51—219 X |
| 2,512,888 | 6/50 | Douglas | 51—219 |
| 2,785,510 | 3/57 | Garrison | 51—288 X |
| 3,037,329 | 6/62 | Ernst et al. | 51—219 X |
| 3,040,480 | 6/62 | Winslow et al. | 51—288 |

FOREIGN PATENTS

| | | |
|---|---|---|
| 1,051,133 | 1/54 | France. |
| 268,270 | 12/13 | Germany. |
| 812,157 | 8/51 | Germany. |
| 189,274 | 11/22 | Great Britain. |

LESTER M. SWINGLE, *Primary Examiner.*